United States Patent [19]

Davis

[11] Patent Number: 4,667,773

[45] Date of Patent: May 26, 1987

[54] PORTABLE TREE STAND

[76] Inventor: Tonnie Davis, 6552 Monnett Rd., Climax, N.C. 27233

[21] Appl. No.: 879,817

[22] Filed: Jun. 27, 1986

[51] Int. Cl.$^4$ ........................ A01M 31/02; A47C 9/10
[52] U.S. Cl. .................................... 182/187; 108/152
[58] Field of Search ............... 182/187, 188, 134, 135; 108/152

[56] References Cited

U.S. PATENT DOCUMENTS

| | | | |
|---|---|---|---|
| 1,206,574 | 11/1916 | Miller | 182/187 |
| 3,338,332 | 8/1967 | Brantly | 182/187 |
| 4,113,058 | 9/1978 | Kobosh | 182/187 |
| 4,236,602 | 12/1980 | Leggett | 182/187 |
| 4,331,216 | 5/1982 | Amacker | 182/187 |
| 4,475,627 | 10/1984 | Eastridge | 182/187 |
| 4,484,660 | 11/1984 | Baynum | 182/187 |
| 4,549,635 | 10/1985 | Early | 182/187 |
| 4,552,246 | 11/1985 | Thomas | 182/187 |
| 4,552,247 | 11/1985 | Purdy | 182/187 |
| 4,553,634 | 11/1985 | Roberts | 182/187 |
| 4,579,198 | 4/1986 | Lee | 182/187 |

Primary Examiner—Reinaldo P. Machado
Attorney, Agent, or Firm—Charles R. Rhodes; Judith E. Garmon

[57] ABSTRACT

A tree stand having a platform and a folding seat member includes a platform supporting frame and brace which engage the tree on which the stand is mounted. The brace and an undergirding pivotally mounted strut include a plurality of unique, triangularly shaped spikes which pierce the bark of the tree. The triangular spikes have flat upper and lower surfaces which join and form a sharp point for piercing the tree. The upper surface enters the tree perpendicularly thereto and the lower surface at an angle acute to the upper surface. When weight is placed on the forward portion of the load bearing platform, the acute angle of the lower surface of the spike is caused to cut deeper into the tree and thus improve stability of the stand.

8 Claims, 5 Drawing Figures

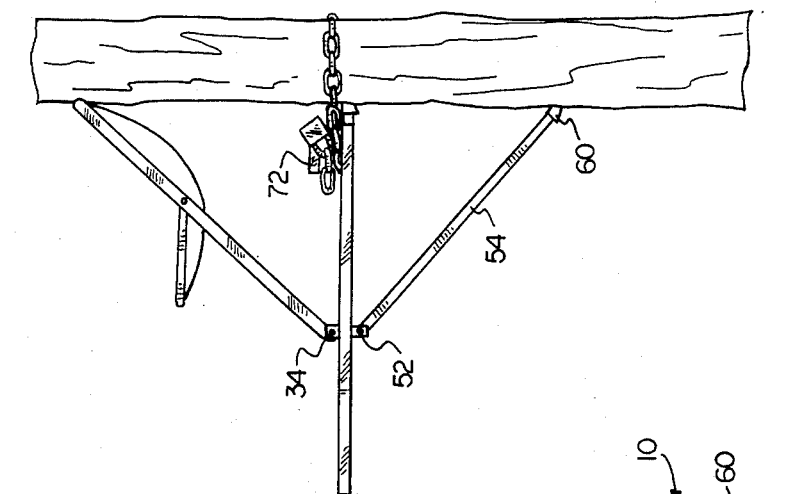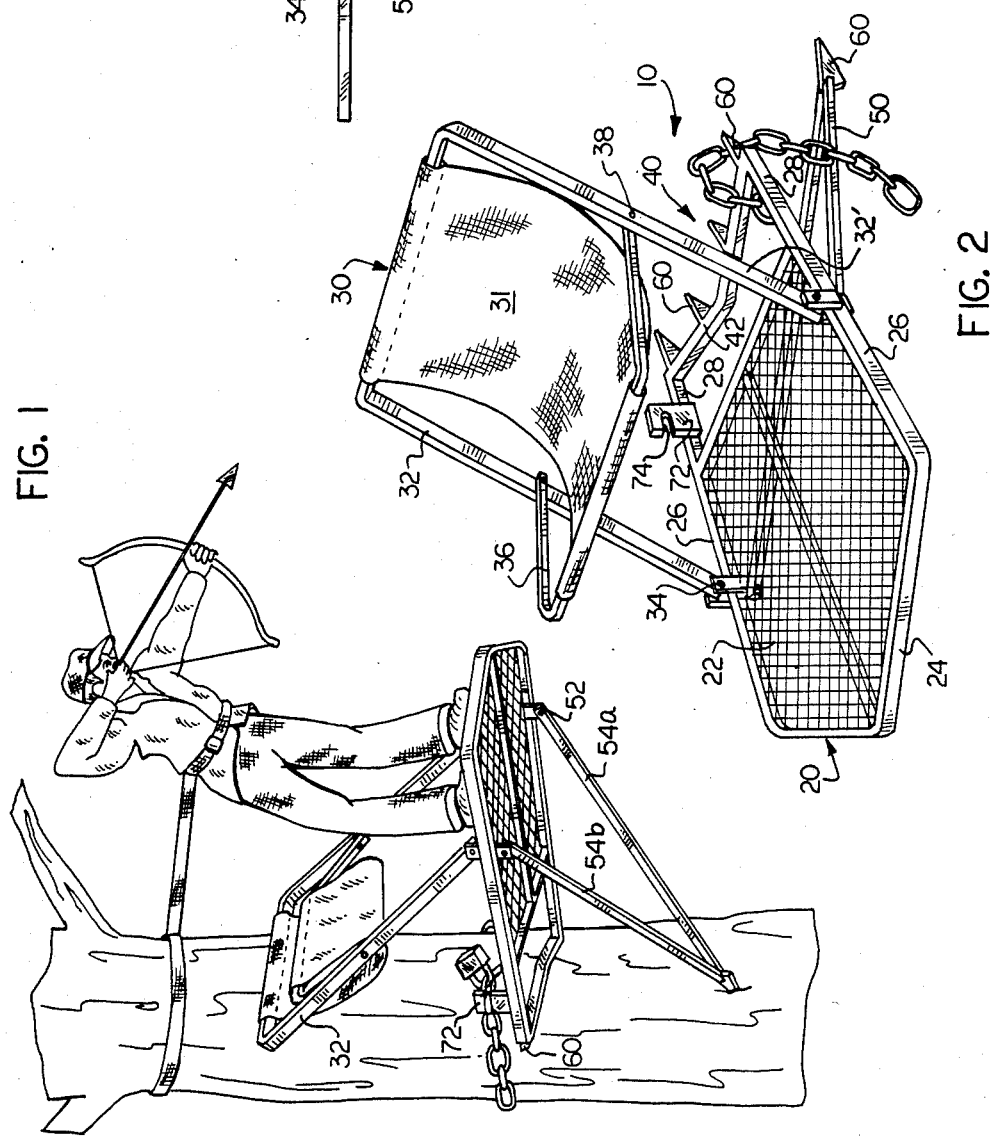

PORTABLE TREE STAND

BACKGROUND AND SUMMARY OF THE PRESENT INVENTION

The present invention is directed to a portable collapsible tree stand of the type usually used by hunters to elevate themselves to a camouflaged position above ground. The elevated support improves the hunter's view of the quarry, and also increases safety and comfort.

A wide variety of such stands are disclosed in U.S. Pat. Nos. 4,552,246; 4,553,634; 4,475,627; 4,549,635; 4,236,602; and 4,579,198. Many such stands known to exist in the prior art are known as "climbing stands", and are used by the hunter as a mechanism for actually climbing the tree. Such "climbing stands" are generally cumbersome and because they must be installed around the bottom of the tree beneath the lower branches, final elevation is limited by the height of lower tree branches. Because these stands are used for climbing, such stands cannot be elevated beyond the tree branches unless the branches are cut off. Additionally, hunter's movements on the stand generally causes the many interacting parts of the stand to rattle and creak. Such noise frightens game away from the area.

Other types of stands, such as those disclosed in the above-cited patents, are elevated to the desired level before attachment to the tree. The tree is climbed or scaled by the hunter using some means other than the stand itself. Ladders, removable climbing spikes, and manual climbing are examples of such means. Once these types of stands are positioned, they are generally quieter during use and, of course, because the stand is carried up the tree, may be installed at any desired height, regardless of the height of the lower branches.

However, many of these stands are not sufficiently stable when mounted on the tree to ensure the safety of the hunter supported thereon. Whereas most of the "climbing" type stands are stabilized by interacting upper and lower climbing levers, the non-climbing stands utilize various types of braces and other supports for stability. The platforms are strapped or chained to the tree and may or may not employ teeth or spikes to pierce the tree.

It has been a goal of most stands to employ stabilizing means which will not damage the tree. Therefore the use of spikes has been curtailed to the point of jeopardizing the stability of the stand and thus the security of the hunter. Some stands use no spikes at all. Other stands use only one or two, which number is frequently insufficient to really accomplish any significant degree of stabilization. Further, many spikes were designed to be so blunt as to prohibit any piercing of the tree and thus were ineffective.

It was therefore a primary objective of the present inventor to provide a tree stand that could be installed at any desired height and which includes means for stabilizing the stand against displacement under maximum weight loads. Although the present application primarily discusses the tree stand as being used primarily by hunters, it should be understood that the stand might be used by photographers, linemen for utility companies, and others who need means for obtaining an elevated support. The stand is applicable to any vertically upright support such as trees or utility poles. Therefore the present description is not meant to be limiting.

The present invention is an improved stand for such uses as previously discussed and includes a combination of support or tree-engaging braces and spikes which render it safe for use on virtually any size support and for relatively large weight loads. The improved tree stand is generally comprised of a loadbearing platform extending horizontally relative to the vertical upright support, and a combination of spiked braces which securely stabilize the platform. A folding seat is to the rear of the platform for use when the hunter or other operator does not require a standing position. The seat folds out of the way when not needed.

The design of the platform, the braces and the spikes is unique also in that a type of leveraged action occurs when weight is placed on the forward portion of the loadbearing platform and causes the novel spikes to cut deeper into the tree or support. The combination of braces includes one brace at the rear, in the same plane as the loadbearing platform, and an undergirding, pivotally attached brace or strut which supports the platform from underneath. Both the brace and strut include spikes for engaging the surface of the tree or other support.

The spikes are uniquely designed in a substantially triangular configuration having opposing flat upper and lower surfaces of a prescribed width and which meet at an acute angle to form a tree-piercing point. The upper surface of the triangular spike is flat and enters the tree or pole substantially perpendicularly thereto and in substantially the same plane as that of the platform. The opposing lower surface of the spike is acutely angled relative to the upper surface for increasing the piercing action of the spike when a downward force is applied against the spike. Because the upper surfaces of the spikes are flat, enter the tree perpendicularly thereto, and enter the tree substantially parallel to and in the same plane as the loadbearing platform, any upward and outward movement of the spike is prevented.

The spikes are spaced equidistantly around the platform rear brace, a plurality preferably of at least four, for engaging a substantial portion of the circumference of the tree. The undergirding platform strut terminates in at least one spike.

In addition to the spike arrangement, a tether device such as a heavy, linked chain has one end permanently attached to the platform frame for looping around the tree and securing in a catch means on the other side of the platform. The tether is looped around the tree such that the loop is positioned substantially parallel to, and only slightly above the plane of the platform.

The catch means for the tether or chain is designed to receive and hold a link of the chain therein. For further security, a lock such as a padlock, may be used to lock the chain around the tree. When locked, the only means for removing the stand from the tree is by cutting the chain, thereby substantially reducing the likelihood of theft when the stand is left in place for extended periods.

The seat member is a folding canvas seat pivotally mounted toward the rear portion of the platform. When the hunter stands up, the seat can be folded back out of the way. The seat back is supported against the tree but is not utilized as a brace member or loadbearing component of the stand. Therefore, manipulation of the seat portion is simple and has no effect on the stability of the stand.

The improved stand is constructed of steel for maximum stability, and welded at all joints to minimize squeaks and rattles. The use of an expanded metal platform provides a high degree of transparency and casts minimum shadows. The transparency also allows the stand to blend in with the limbs and trees in the background.

The present invention therefore achieves the primary objective of providing a stable, secure collapsible tree stand which can be positioned at any level, will minimize noise during use, and will be substantially camouflaged by background vegetation. Another significant objective is the provision of a tree stand that can be positioned safely at any desired height and, when weight is exerted at the forward portion of the platform, increased leverage drives the attachment further into the tree to improve stability.

Other and further objectives will become apparent to those skilled in the art when the following detailed description is studied in conjunction with the accompanying drawings. In the drawings:

FIG. 1 is an environmental perspective view of the present invention as positioned on a tree;

FIG. 2 is a perspective view of the stand apart from any vertical support;

FIG. 3 is a side elevational view of the stand as depicted in FIG. 1;

DETAILED DESCRIPTION OF A PREFERRED EMBODIMENT

Figure 5:
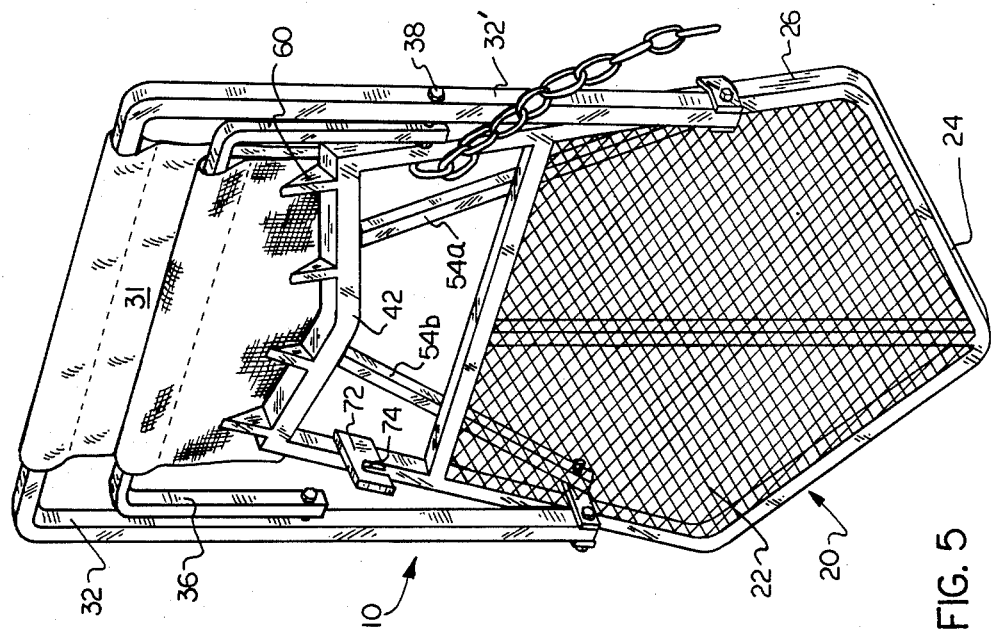
FIG. 5 illustrates the stand in a collapsed form.

Looking first at FIG. 1, the present invention is illustrated open and mounted on a tree at a prescribed or selected height for use by hunters, photographers, etc. The stand 10 generally includes a platform 20, a seat 30, a tree-engaging brace 40 and an undergirding, pivoting strut 50. FIG. 5 illustrates the same stand in a collapsed state for carrying.

The platform 20 is preferably formed from a sheet of rigid expanded metal wire or grating 22, which is surrounded by a supporting frame comprised of a forward portion 24, a pair of opposing, substantially parallel side portions 26, and a pair of rearwardly extending legs 28. The frame is preferably a welded steel construction for durability and strength. It is possible to make the frame out of heavy tubular steel or aluminum, but the solid steel frame is preferred.

The seat 30 is canvas material, in a sling-type construction 31 mounted on a pivotal, folding frame. The chair back support is a pivoting frame 32, attached by lower leg portions 32' to pivot points 34 on the sides 26 of the frame. The seat support is on a second frame 36 pivotally connected to frame 32 at opposing pivot points 38. As shown in FIG. 1 the seat back 32 rests against the trunk of the tree, with the seat portion folded back away from the hunter. In FIGS. 2 and 3, the seat portion is folded outwardly to form a seat. Any further outward and downward pivot of the seat is prevented by the length of the fabric sling 31. The seat frame pivot points 34 are positioned at the approximate midpoint of the platform 20. The pivots 34 are directly over pivots 52 of the strut.

A first brace member 40 extends to the rear of the supporting platform 20. The brace 40 is defined by the rearwardly extending legs 28 of the frame, and a crossmember 42 extending between legs 28. The crossmember 42 is somewhat arcuate in shape, curving inwardly toward platform 20 to conform to the shape of the tree or support on which the stand is mounted.

A plurality of spikes 60 are aligned in horizontally spaced relationships along the outer edge of crossmember 42 for embedding in the bark of the tree. The spikes 60 are explained in greater detail below.

An undergirding strut 50 pivots at 52 underneath the platform 20 and frame to extend substantially diagonally between the underside of the sides 26 of the platform frame and the tree or support. The strut 50 is a V-shaped brace formed by side members or bars 54A and 54B which are joined to the frame at pivot means 52 and, opposite the pivot ends, to each other by a spike 60 welded therebetween. When mounted on a support, the spike 60 of the strut engages the support at a point below the platform and underlying the approximate midpoint of the horizontal crossmember 42 of the brace.

Figure 4:
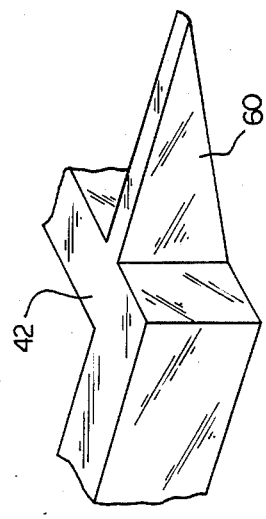
FIG. 4 is a detailed view of the spike.

The spikes 60 (see FIG. 4) are uniquely designed in that each has a flat upper surface 62 and an opposite, flat lower surface or underside 64, along with sides 66. The upper and lower surfaces 62,64 are joined to each other at an acute angle forming a sharp point 68. The upper surface 62 is flat and lies in a plane substantially parallel to the surface of platform 20. Note that spike 60' on strut 50 is mounted at an angle less than 180° in relationship to bars 54.

Spikes 60 on brace 40 enter the support or tree substantially perpendicularly thereto. The undersurface 64 is at an acute angle thereto. Therefore, after the spikes are initially embedded in the tree and as weight is placed on the forward portion of the platform, the downward pressure forces the undersurface 64 further into the tree.

A tether device in the form of a heavy chain 70 is welded to one leg 28 of the frame. In use the chain loops around the tree and a link is slipped into a notch 74 in catch means 72. The link will hold in the notch without further attachment. However, to prevent theft, a padlock 76 may be engaged in the chain links to prohibit removal from catch means 72. The chain is looped tightly around the tree in a position such that the loop is substantially parallel to the loadbearing platform and in a plane only slightly above the plane of the platform. When so positioned, any twisting or dislocation of the stand is virtually impossible because downward pressure on the platform causes the tether or chain to bite into the tree.

Although a preferred embodiment of the stand has been described, many modifications may be made without departing from the scope of the invention which is limited only by the claims below.

What is claimed is:

1. A portable collapsible stand of the type supported on a tree, pole, or other upright support and used by linemen, hunters, photographers and others who require an elevated position for various reasons such as viewing or hunting wildlife and for camouflage; said collapsible stand comprising:
    (a) a loadbearing platform having front and rear portions and being positioned horizontally relative to the vertical upright support, for supporting an operator thereon;
    (b) an outer frame surrounding said platform; the parallel side portions of said frame extending beyond and to the rear of said platform to form a pair of parallel, support-engaging legs;
    (c) a brace member comprised of said legs and a cross member mounted transversely between said legs in a plane substantially the same as that of said platform for abutting the upright support; said brace crossmember having a substantially arcuate shape, curved inwardly toward said platform, for engaging a portion of the circumference of the upright support;

(d) a stabilizing strut pivotally mounted to the underside of said frame, the end of said strut opposite said pivotal mount including means for engaging the upright support below said platform at a point approximately in line with the horizontal mid-point of said brace;

(e) a plurality of spikes for engaging the upright support; said spikes being arranged in a prescribed pattern on said cross member, each of said frame legs, and on said strut means; said spikes being substantially traingularly shaped and having flat upper and lower surfaces which join to form a sharp point for piercing the vertical support; said flat upper and lower surfaces of said spikes having a prescribed width dimension; said upper surface lying in a plane common to the plane of the upper surface of said brace and piercing said vertical support substantially at a right angle to the vertical support; said lower surface joining said upper surface at an acute angle to said upper surface;

(f) tether means mounted on one of said legs for looping around the upright support and releasably attaching to the other of said legs for securing said stand to the upright support.

2. A collapsible stand according to claim 1 wherein said prescribed pattern for arranging said spikes on said brace includes one of said spikes mounted on the end of each of said legs, and at least two of said spikes mounted on said crossmember, said spikes being spaced equidistantly across the width of said brace.

3. A collapsible stand according to claim 1 wherein said stabilizing strut is comprised of a pair of elongated bars mounted to the underside of said frame; the terminal ends of said bars opposite the pivot ends meeting and being joined together for engaging the vertical support; said strut further including at least one spike mounted at said terminal ends of said bars.

4. A collapsible stand according to claim 3 wherein said elongated bars are pivotally mounted to the underside of said frame at pivot points positioned on each parallel side portion of said frame, substantially at the mid-point between the vertical support and said front portion of said platform.

5. A collapsible stand according to claim 1 wherein said acute angle between said upper and lower surfaces is an angle less than 90°.

6. A collapsible stand according to claim 1 wherein said tether means is looped around the vertical support in a position such that the looped portion of said tether is substantially parallel to said loadbearing platform.

7. A collapsible stand according to claim 1 wherein said tether means includes a flexible chain permanently secured to one of said legs; the other of said legs including catch means for receiving and securely holding the free end of said chain after said chain is looped around the upright support.

8. A collapsible stand according to claim 7 wherein said tether means further includes a lock for securing said chain in said catch means.

* * * * *